US012738254B2

(12) United States Patent
Wang et al.

(10) Patent No.: US 12,738,254 B2
(45) Date of Patent: Sep. 15, 2026

(54) DISPLAY DRIVING DEVICE AND DISPLAY INCLUDING THE SAME

(71) Applicant: MACROBLOCK, INC., Hsinchu (TW)

(72) Inventors: WenChi Wang, Hsinchu City (TW); Shihying Tang, Hsinchu City (TW); Yu Chun Tsai, Hsinchu City (TW)

(73) Assignee: MACROBLOCK, INC., Hsinchu City (TW)

( * ) Notice: Subject to any disclaimer, the term of this patent is extended or adjusted under 35 U.S.C. 154(b) by 0 days.

(21) Appl. No.: 19/000,291

(22) Filed: Dec. 23, 2024

(65) Prior Publication Data

US 2025/0299647 A1 Sep. 25, 2025

(30) Foreign Application Priority Data

Mar. 20, 2024 (TW) ................................ 113110363

(51) Int. Cl.
*G09G 5/00* (2006.01)
*G06F 3/14* (2006.01)

(52) U.S. Cl.
CPC ............... *G09G 5/008* (2013.01); *G06F 3/14* (2013.01); *G09G 2340/0407* (2013.01); *G09G 2370/045* (2013.01); *G09G 2370/14* (2013.01)

(58) Field of Classification Search
CPC ........... G09G 5/008; G09G 2340/0407; G09G 2370/045; G09G 2370/14; G09G 5/00; G06F 3/14
See application file for complete search history.

(56) References Cited

U.S. PATENT DOCUMENTS 10,274,766 B2 † 4/2019 Li
10,529,288 B2 † 1/2020 Jung
11,176,906 B2 * 11/2021 Aubineau .............. G09G 5/003
2019/0043430 A1 * 2/2019 Jung .................... G09G 3/3291
2019/0156728 A1 * 5/2019 Yu ........................ G09G 3/2092

FOREIGN PATENT DOCUMENTS

WO 2021208483 † 10/2021

* cited by examiner
† cited by third party

*Primary Examiner* — Brent D Castiaux
(74) *Attorney, Agent, or Firm* — Maschoff Brennan

(57) ABSTRACT

A display driving device, applicable for at least one display area, includes a plurality of drivers, at least one timing controller and at least one intermediate controller. The intermediate controller is connected to the at least one timing controller and the plurality of drivers. The drivers are configured to drive a plurality of pixels in at least one display area, respectively. The at least one timing controller is configured to obtain the first addressing display signal of the pixels, and generate a second addressing display signal according to the first addressing display signal. The intermediate controller is configured to transmit at least a portion of the second addressing display signal to the drivers to drive the at least one display area according to a plurality of address information in the second addressing display signal. The signal processing capability of the repeater is lower than that of the timing controller.

10 Claims, 6 Drawing Sheets

DISPLAY DRIVING DEVICE AND DISPLAY INCLUDING THE SAME

CROSS-REFERENCE TO RELATED APPLICATIONS

This non-provisional application claims priority under 35 U.S.C. § 119 (a) on U.S. patent application Ser. No. 11/3, 110,363 filed in Republic of China on Mar. 20, 2024, the entire contents of which are hereby incorporated by reference.

BACKGROUND

1. Technical Field

The disclosure relates to a driving device, and more particularly, to a display driving device.

2. Related Art

The current architecture of display driving devices generally involves a master chip performing scaling and segmentation of the image before transmitting the data to a timing controller. The timing controller enhances and compensates the image data received and outputs it to subsequent driving components for display. For each display area, a separate timing controller is required.

However, the architecture where each display area is equipped with a timing controller results in excessively high overall layout costs.

SUMMARY

Accordingly, this disclosure provides a display driving device and a display.

According to an embodiment of this disclosure, the display driving device, applicable for at least one display area, comprises a plurality of drivers, at least one timing controller and at least one intermediate controller. The intermediate controller connected to the at least one timing controller and the plurality of drivers. The plurality of drivers configured to drive a plurality of pixels in the at least one display area, respectively. The at least one timing controller configured to obtain a first addressed display signal of the plurality of pixels, and generate a second addressed display signal based on the first addressed display signal. The intermediate controller configured to transmit at least one portion of the second addressed display signal to the plurality of drivers according to a plurality of address information within the second addressed display signal to drive the at least one display area, wherein the intermediate controller has lower signal processing capability than the timing controller.

According to an embodiment of this disclosure, the display comprises the display driving device mentioned above and at least one display area, wherein the at least one display area connected to and controlled by the display driving device.

In view of the above description, the display driving device and display disclosed in the present disclosure may utilize an intermediate controller with a lower signal processing capability than a timing controller to receive and parse the output display image, then the parsed display image is output to a plurality of drivers to drive at least one display area, and the display driving device may reduce the quantity of timing controllers needed and the device cost, while also effectively minimizing the layout size and overall layout cost.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
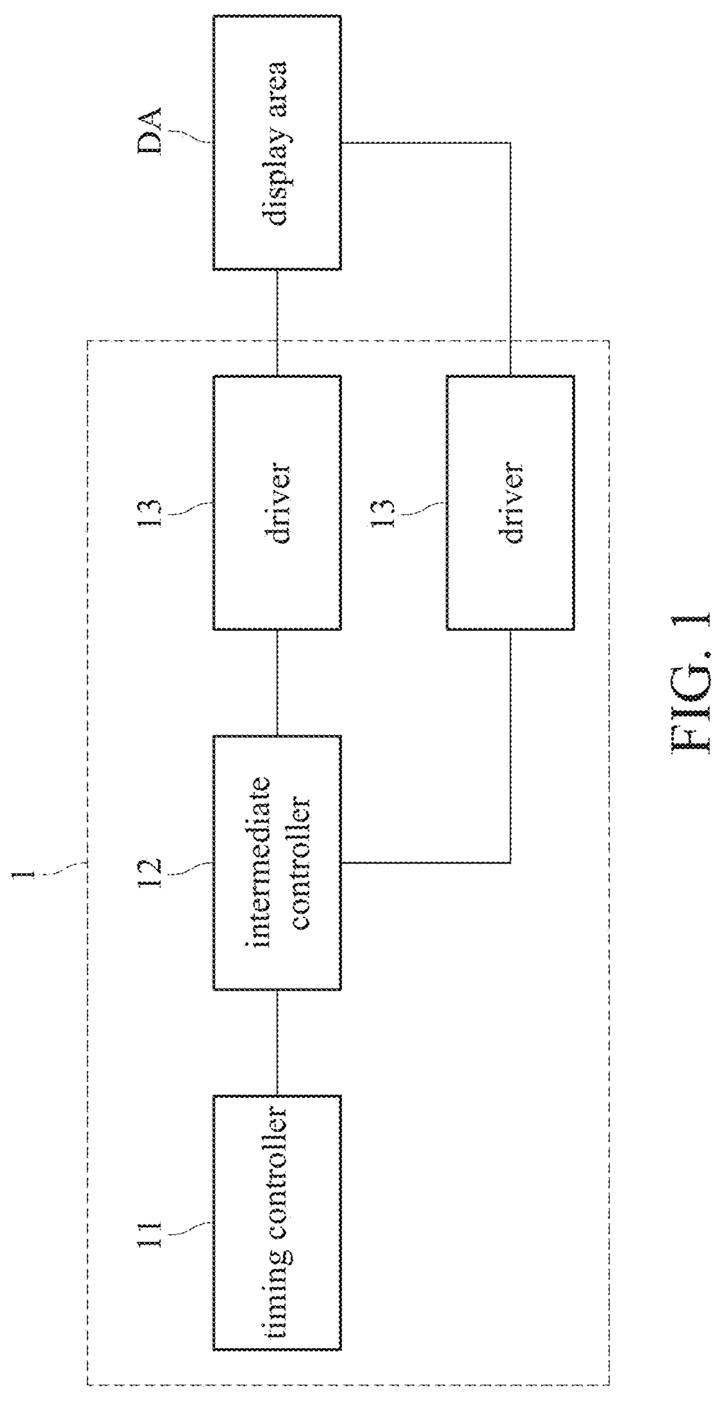
FIG. 1 is a block diagram illustrating a display driving device according to an embodiment of the present disclosure.

Please refer to FIG. 1, which is a block diagram illustrating a display driving device according to an embodiment of the present disclosure. As shown in FIG. 1, the display driving device 1 is applicable for at least one display area DA, and includes a timing controller 11, at least one intermediate controller 12, and a plurality of drivers 13. The intermediate controller 12 is connected to the timing controller 11 and the plurality of drivers 13, and the plurality of drivers 13 are connected to the display area DA to drive a plurality of pixels within the display area DA, respectively. It is worth noting that FIG. 1 exemplarily presents the embodiment where the quantity of drivers is two, but the disclosure is not limited to this. Specifically, the quantity of drivers may depend on the quantity of pixels in each display area. Assuming each display area has P pixels, the quantity of drivers may be P, where P is a natural number greater than one.

The timing controller 11 is configured to obtain a first addressed display signal of a plurality of pixels in the display area DA and generate a second addressed display signal based on the first addressed display signal. Specifically, the timing controller 11 may perform enhancement and compensation on the first addressed display signal of the plurality of pixels to improve pixel resolution to generate the second addressed display signal after obtaining the first addressed display signal from a master chip, wherein the master chip may also be referred to as a scaler. Furthermore, the timing controller 11 may temporarily store the enhancement and compensation data for the plurality of pixels in memory (e.g., dynamic random-access memory or read-only memory).

The intermediate controller 12 is configured to transmit at least a portion of the second addressed display signal to the plurality of drivers 13 based on a plurality of address information in the second addressed display signal so as to drive the display area DA. Specifically, the plurality of address information of the second addressed display signal may respectively correspond to the arrangement positions (display positions) of the pixels driven by the plurality of drivers, such as coordinates. In one implementation, each driver 13 may extract a target portion of at least a portion of the second addressed display signal based on partial address information of said at least a portion of the second addressed display signal received from the intermediate controller 12, and drive the corresponding pixels in the display area DA according to the target portion. In this implementation, the driver 13 may include a processing unit, such as a microcontroller, for performing the above-mentioned extraction. In another implementation, the intermediate controller 12 may divide at least a portion of the second addressed display signal into multiple sub-signals based on the plurality of address information of the second addressed display signal, and transmit these sub-signals to the plurality of drivers 13, respectively.

The signal processing capability of the intermediate controller 12 is lower than the signal processing capability of the timing controller 11. Furthermore, the intermediate controller 12 may not perform image enhancement and compensation, meaning it lacks the capability for image enhancement and compensation. Therefore, the size of the intermediate controller 12 may be smaller than the size of the timing controller 11 so as to reduce the overall circuit layout cost of the display.

Figure 2:
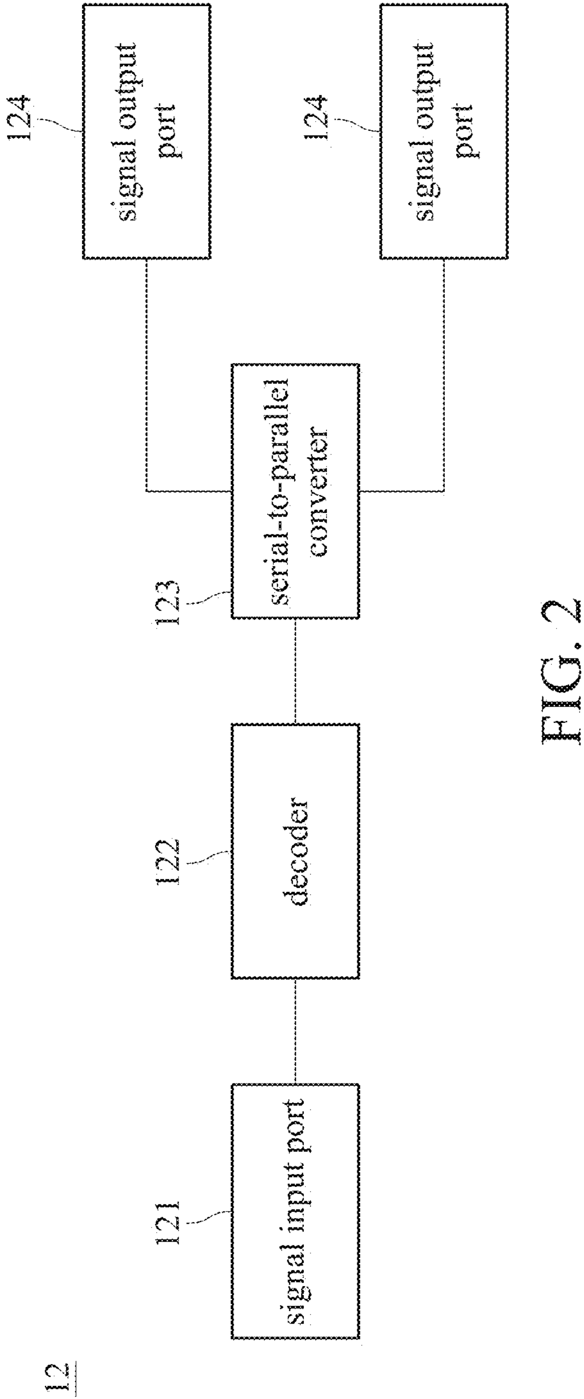
FIG. 2 is a block diagram illustrating an intermediate controller according to an embodiment of the present disclosure.

Please refer to FIG. 2, which is a block diagram illustrating the intermediate controller according to an embodiment of the present disclosure. The intermediate controller 12 may include a signal input port 121, a decoder 122, a serial-to-parallel converter 123, and a plurality of signal output ports 124. The signal input port 121 may be connected to the timing controller 11 in FIG. 1. The decoder 122 may be connected to the signal input port 121 and the serial-to-parallel converter 123, and the serial-to-parallel converter 123 may be further connected to the plurality of signal output ports 124. The plurality of signal output ports 124 may be connected to the plurality of drivers 13 in FIG. 1.

The signal input port 121 is configured to receive the second addressed display signal from the timing controller 11 in FIG. 1. The decoder 122 is configured to generate a third addressed display signal based on the plurality of address information in the second addressed display signal. Specifically, the decoder 122 may parse the address information in the second addressed display signal, extract the partial signal corresponding to the address information of the connected drivers 13 (as the third addressed display signal), and transmit the extracted partial signal to the serial-to-parallel converter 123. The serial-to-parallel converter 123 is configured to convert the third addressed display signal from the decoder 122 into a plurality of parallel signals to achieve high-to-low signal rate transmission, and configured to output the plurality of parallel signals through the plurality of signal output ports 124 to the plurality of drivers 13 in FIG. 1. Furthermore, the signal input port 121 and the signal output ports 124 may use low-voltage differential signaling (LVDS) technology to transmit signals. LVDS is applicable to various electronic signal systems and operates with low amplitude and low current, driving signal transmission at a data rate range from megabits per second (Mbps) to gigabits per second (Gbps) using a system voltage of 2 volts, achieving low noise, low power consumption, and reduced interference. In another embodiment, besides the above-mentioned elements, the intermediate controller 12 may further include a control interface. The control interface may be connected to the decoder 122 and allow the user to set the address information used by the decoder 122 for signal extraction.

Figure 3:
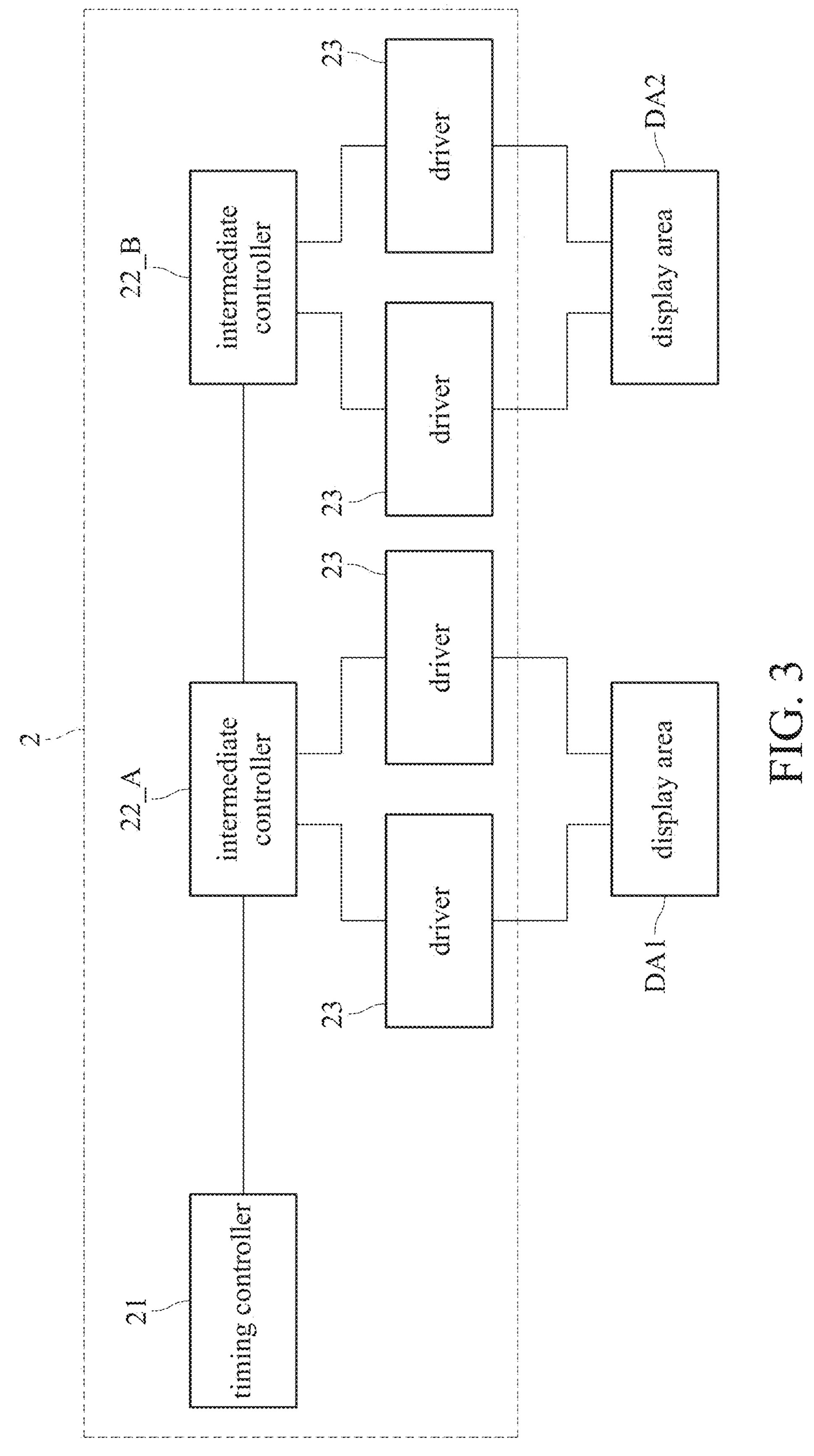
FIG. 3 is a block diagram illustrating a display driving device according to another embodiment of the present disclosure.

Please refer to FIG. 3, which is a block diagram illustrating the display driving device according to another embodiment of the present disclosure. As shown in FIG. 3, the display driving device 2 may include a timing controller 21, a plurality of intermediate controllers 22_A and 22_B, and a plurality of drivers 23. The intermediate controller 22_A may be connected to the timing controller 21, the intermediate controller 22_B, and the first portion of the plurality of drivers 23, and the first portion of the plurality of drivers 23 is connected to the display area DA1; the intermediate controller 22_B may be connected to a second portion of the plurality of drivers 23, and the second portion of the plurality of drivers 23 is connected to the display area DA2. The structures, connections, and functions of the timing controller 21, the plurality of intermediate controllers 22_A and 22_B, the plurality of drivers 23, and the display areas DA1 and DA2 are substantially the same as the corresponding elements in the embodiment shown in FIG. 1, and are not redundantly described here. In this embodiment, the signal output port of the intermediate controller 22_A may be connected to the signal input port of the intermediate controller 22_B, and the intermediate controller 22_A may be configured to transmit at least a portion of the second addressed display signal to the intermediate controller 22_B. Specifically, the signal transmitted from intermediate controller 22_A to intermediate controller 22_B may be the complete second addressed display signal or the remaining signal after removing the portion needed by intermediate controller 22_A based on the address information. In this embodiment, the timing controller 21 may enhance, compensate, and output display images for the plurality of display areas DA1 and DA2 separately, so as to generate the second addressed display signal, which is then parsed and converted by the plurality of intermediate controllers 22_A and 22_B before being transmitted to the drivers 23. It should be noted that FIG. 3 exemplarily shows two intermediate controllers and two drivers connected to each intermediate controller, but the disclosure is not limited to this. As above-mentioned, the quantity of drivers may depend on the quantity of pixels in each display area. The quantity of timing controllers may depend on the quantity of display areas.

Figure 4:
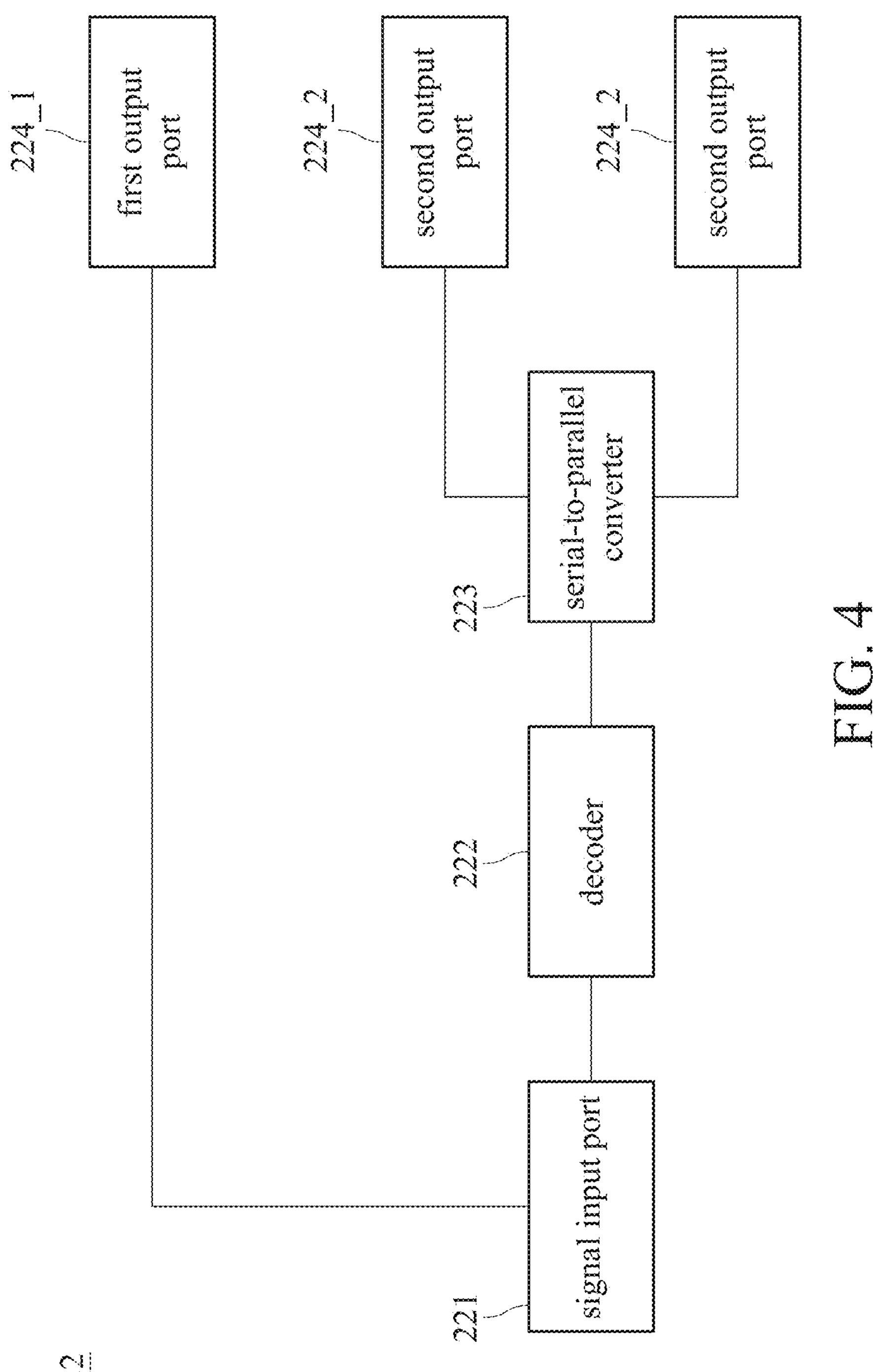
FIG. 4 is a block diagram illustrating an intermediate controller according to another embodiment of the present disclosure.

Please refer to FIG. 3 and FIG. 4. FIG. 4 is a block diagram illustrating the intermediate controller according to another embodiment of the present disclosure. As shown in FIG. 4, the intermediate controller 22 includes a signal input port 221, a decoder 222, a serial-to-parallel converter 223, a first output port 224_1, and a plurality of second output ports 224_2. The signal input port 221 may be connected to the first output port 224_1. The decoder 222 may be connected to the signal input port 221 and the serial-to-parallel converter 223, and the serial-to-parallel converter 223 is further connected to the plurality of second output ports 224_2. The structures, connections, and functions of the signal input port 221, the decoder 222, and the serial-to-parallel converter 223 are substantially the same as those in the embodiment shown in FIG. 2 and are not redundantly described here.

In this embodiment, the intermediate controller 22 connects to the signal input port of another intermediate controller through the first output port 224_1, and connects to the plurality of drivers through the plurality of second output ports 224_2, respectively. Using the intermediate controller 22 to implement the intermediate controller 22_A in FIG. 3, the first output port 224_1 may connect to the signal input port of the intermediate controller 22_B, and the second output ports 224_2 may connect to a driver 23, respectively. The intermediate controller 22_A may receive the second addressed display signal from the timing controller 21 through the signal input port 221, and transmit the second addressed display signal to the intermediate controller 22_B through the first output port 224_1. The second addressed display signal is parsed and converted by the decoder 222 and the serial-to-parallel converter 223, and the parsed and converted parallel signals are transmitted to the drivers 23 through the second output ports 224_2 to drive the display area DA1. The parsing and converting details are as described in the embodiment of FIG. 2 and are not redundantly described here.

Figure 5:
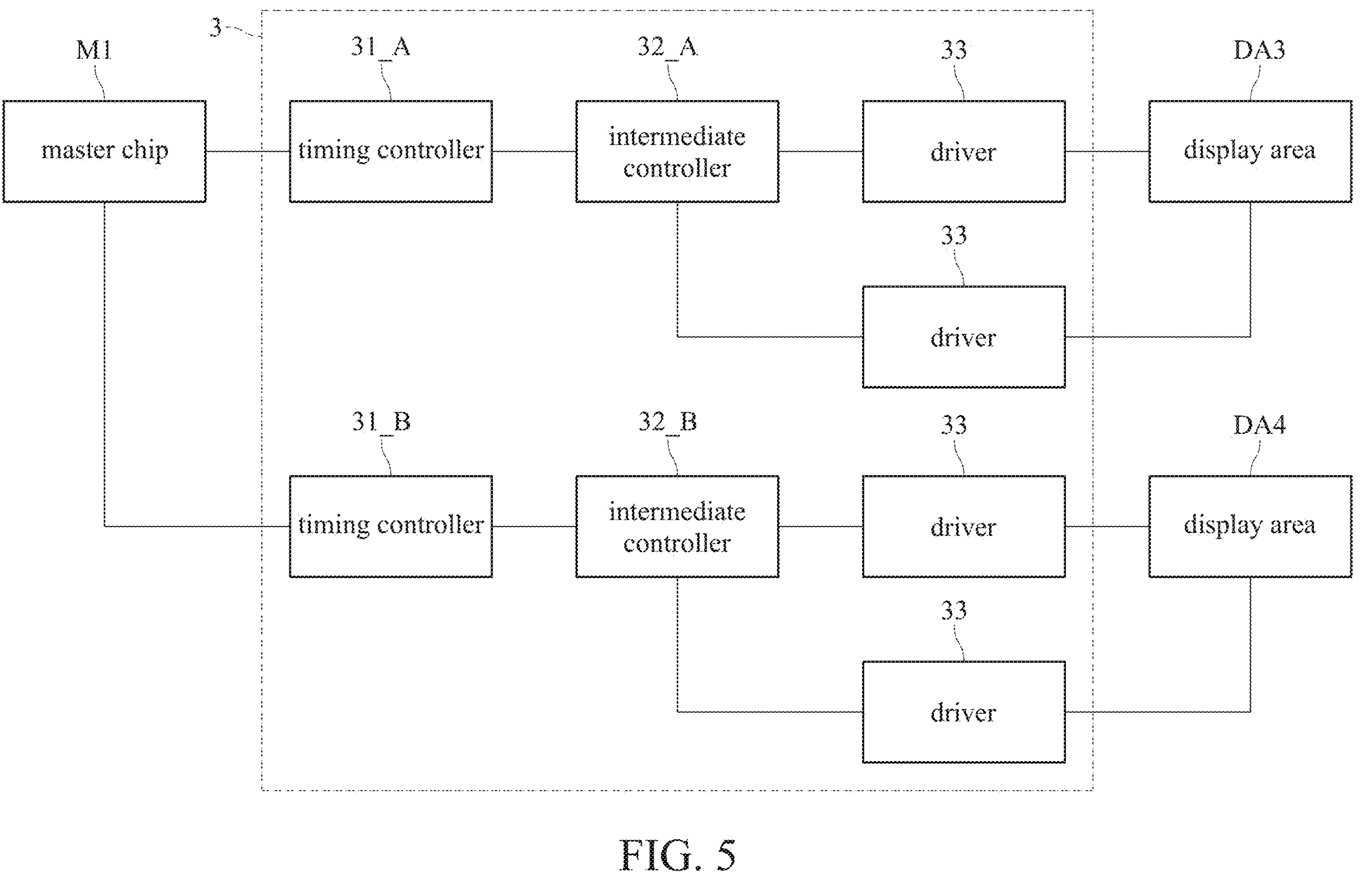
FIG. 5 is a block diagram illustrating a display driving device according to still another embodiment of the present disclosure.

Please refer to FIG. 5, which is a block diagram illustrating the display driving device according to still another embodiment of the present disclosure. The display driving device 3 includes a plurality of timing controllers 31_A and 31_B, a plurality of intermediate controllers 32_A and 32_B, and a plurality of drivers 33. The intermediate controllers 32_A and 32_B are connected to the master chip M1. The intermediate controller 32_A may be connected to the timing controller 31_A and the first portion of the plurality of drivers 33, which are connected to the display area DA3, respectively. The intermediate controller 32_B may be connected to the timing controller 31_B and the second portion of the plurality of drivers 33, which are connected to the display area DA4. The implementation of the timing controllers 31_A/31_B, the intermediate controllers 32_A/32_B, and the drivers 33 connected to the intermediate controllers 32_A/32_B are substantially the same as the above-mentioned embodiments and are not redundantly described here. It should be noted that FIG. 5 exemplarily shows the quantity of timing controllers and the quantity of intermediate controllers are two, respectively, and each of intermediate controllers are connected to two drivers, but the disclosure is not limited to this. As above described, the quantity of drivers may depend on the quantity of pixels in each display area. The quantity of timing controllers and intermediate controllers may depend on the quantity and arrangement of display areas. For a plurality of display areas arranged in a matrix of M×N, the quantity of timing controllers may be M and the quantity of intermediate controllers may be N, or the quantity of timing controllers may be N and the quantity of intermediate controllers may be M, where M and N are natural numbers greater than one.

In this embodiment, the timing controllers 31_A and 31_B may be connected in parallel to the master chip M1 to receive the first addressed display signal from the master chip M1. Specifically, the master chip M1 may generate a first addressed display signal corresponding to the display area DA3 and a first addressed display signal corresponding to the display area DA4, transmitting the first addressed display signal corresponding to the display area DA3 to intermediate controller 32_A and the first addressed display signal corresponding to the display area DA4 to intermediate controller 32_B. In another embodiment, the timing controllers 31_A and 31_B may be connected in series to the master chip M1. When the timing controller 31_A receives the display signal, the timing controller 31_A may transmit the display signal to the timing controller 31_B. Specifically, the master chip MI may generate a first addressed display signal with address information corresponding to the display area DA3 and address information corresponding to the display area DA4 and transmit to the timing controller 31_A. The timing controller 31_A may extract a signal segment having address information corresponding to the display area DA3 from the first addressed display signal and accordingly generate the second addressed display signal, and transmit the first addressed display signal to the serial timing controller 31_B. The timing controller 31_B may extract a signal segment having address information corresponding to the display area DA4 from the first addressed display signal and accordingly generate the second addressed display signal.

Figure 6:
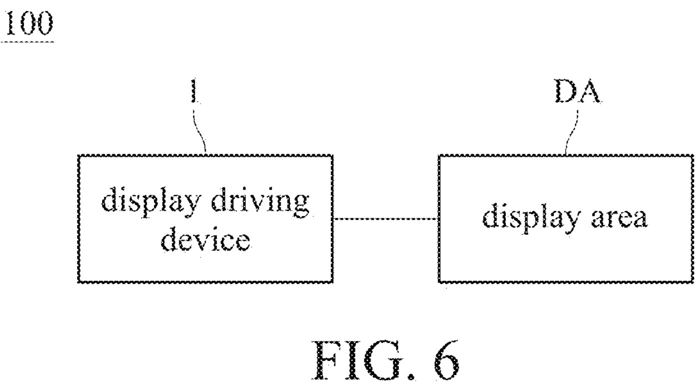
FIG. 6 is a block diagram illustrating a display according to an embodiment of the present disclosure.

Please refer to FIG. 6, which is a block diagram illustrating the display according to an embodiment of the present disclosure. The display 100 may include a display driving device 1 and at least one display area DA, which is connected to and controlled by the display driving device 1. The display driving device 1 may be implemented as the display driving device in any of the embodiments described above. Additionally, the size of the display area DA may be adjusted according to requirements and is not limited to a fixed size.

In view of the above description, the display driving device and display disclosed in the present disclosure may use an intermediate controller with a lower signal processing capability than a timing controller to receive and parse the output display images, and the parsed display images are then output to a plurality of drivers to drive at least one display area, thereby reducing the quantity of timing controllers needed, lowering device cost, and effectively minimizing layout size and cost.

What is claimed is:

1. A display driving device, applicable for at least one display area, comprising:

a plurality of drivers configured to drive a plurality of pixels in the at least one display area, respectively;

at least one timing controller configured to obtain a first addressed display signal of the plurality of pixels and generate a second addressed display signal based on the first addressed display signal; and at least one intermediate controller connected to the at least one timing controller, and configured to transmit at least one portion of the second addressed display signal to the plurality of drivers according to a plurality of address information within the second addressed display signal to drive the at least one display area;

wherein the at least one intermediate controller has lower signal processing capability than the at least one timing controller, wherein the at least one intermediate controller is configured to parse the plurality of address information within the second addressed display signal and distribute different portions of the second addressed display signal to the plurality of drivers based on the plurality of address information.

2. The display driving device according to claim 1, wherein the at least one intermediate controller comprises a signal input port connected to the at least one timing controller, configured to receive the second addressed display signal;

a plurality of signal output ports;

a decoder connected to the signal input port and configured to generate a third addressed display signal based on the plurality of address information and the second addressed display signal; and a serial-to-parallel converter connected to the decoder and to at least one portion of the plurality of signal output ports, configured to convert the third addressed display signal into a plurality of parallel signals, and outputting the plurality of parallel signals to the plurality of drivers through the at least one portion of the plurality of signal output ports.

3. The display driving device according to claim 2, wherein the signal input port and the plurality of signal output ports use a low-voltage differential signaling technology.

4. The display driving device according to claim 2, wherein a quantity of the at least one intermediate controller is plural, and the plurality of signal output ports of one of the intermediate controllers comprises:

a first output port connected to the signal input port and to the signal input port of another one of the intermediate controllers; and a plurality of second output ports connected to the serial-to-parallel converter, and connected to the plurality of drivers, respectively.

5. The display driving device according to claim 1, wherein a quantity of the at least one intermediate controller is plural, and a signal output port of a first intermediate controller of the at least one intermediate controller is connected to a signal input port of a second intermediate controller of the at least one intermediate controller, and the first intermediate controller is configured to transmit the at least one portion of the second addressed display signal to the second intermediate controller.

6. The display driving device according to claim 1, wherein each of the plurality of drivers is configured to extract a target portion of the at least one portion of the second addressed display signal based on part of the plurality of address information within the at least one portion of the second addressed display signal, and drive the at least one display area based on the target portion.

7. The display driving device according to claim 1, wherein the at least one intermediate controller is configured to divide the at least one portion of the second addressed display signal into a plurality of sub-signals based on the plurality of address information and to transmit the plurality of sub-signals to the plurality of drivers, respectively.

8. The display driving device according to claim 1, wherein the at least one intermediate controller does not perform image enhancement and compensation.

9. A display, comprising:

the display driving device according to claim 1; and the at least one display area connected to and controlled by the display driving device.

10. A display, comprising:

a plurality of display areas;

a plurality of drivers configured to drive a plurality of pixels in the plurality of display areas;

a timing controller configured to obtain a first addressed display signal of the plurality of pixels and generate a second addressed display signal based on the first addressed display signal; and a plurality of intermediate controllers connected to the timing controller and the plurality of drivers, and configured to transmit at least one portion of the second addressed display signal to the plurality of drivers according to a plurality of address information within the second addressed display signal to drive the plurality of display areas;

wherein the plurality of intermediate controllers each have lower signal processing capability than the timing controller, and wherein the plurality of intermediate controllers is configured to parse the plurality of address information within the second addressed display signal and distribute different portions of the second addressed display signal to the plurality of drivers based on the plurality of address information.

* * * * *